(12) United States Patent
Vinamata et al.

(10) Patent No.: US 10,312,784 B2
(45) Date of Patent: Jun. 4, 2019

(54) SWITCHED RELUCTANCE MOTOR WITH REDUCED TORQUE RIPPLE

(71) Applicant: Jaguar Land Rover Limited, Coventry (GB)

(72) Inventors: Xavier Vinamata, Coventry (GB); Alexandros Michaelides, Coventry (GB); Philip Topping, Coventry (GB)

(73) Assignee: Jaguar Land Rover Limited, Coventry, Warwickshire (GB)

( * ) Notice: Subject to any disclaimer, the term of this patent is extended or adjusted under 35 U.S.C. 154(b) by 0 days.

(21) Appl. No.: 15/316,958

(22) PCT Filed: Jun. 8, 2015

(86) PCT No.: PCT/EP2015/062684
§ 371 (c)(1),
(2) Date: Dec. 7, 2016

(87) PCT Pub. No.: WO2015/189137
PCT Pub. Date: Dec. 17, 2015

(65) Prior Publication Data
US 2017/0117787 A1    Apr. 27, 2017

(30) Foreign Application Priority Data
Jun. 12, 2014  (GB) .................................. 1410450.9

(51) Int. Cl.
*H02K 19/24* (2006.01)
*H02K 29/03* (2006.01)
(Continued)

(52) U.S. Cl.
CPC ............. *H02K 29/03* (2013.01); *H02K 1/246* (2013.01); *H02K 15/022* (2013.01);
(Continued)

(58) Field of Classification Search
CPC ......... G01P 3/443; G01P 3/488; H02K 19/24; H02K 19/103; B60T 8/329
See application file for complete search history.

(56) References Cited

U.S. PATENT DOCUMENTS 4,647,802 A * 3/1987 Konecny ............... H02K 19/103
310/162
5,717,269 A * 2/1998 Tang .................... H02K 19/103
310/168
(Continued)

FOREIGN PATENT DOCUMENTS

CN         103201932 A    7/2013
EP         0 543 625 A2   5/1993
(Continued)

OTHER PUBLICATIONS

Combined Search and Examination Report, GB Application No. 1410450.9, dated Nov. 21, 2014, 7 pages.
(Continued)

*Primary Examiner* — Rina I Duda
(74) *Attorney, Agent, or Firm* — Myers Bigel, P.A.

(57) ABSTRACT

Aspects of the invention relate to a switched reluctance motor and the reduction of motor torque output ripple by inclusion of flux barriers. The inclusion of flux barriers running parallel to the motor shaft axis located in the appropriate places in either or the rotor and stator can modify the torque profile output of the motor markedly reducing potential vibration problems in a vehicle driveline.

15 Claims, 10 Drawing Sheets

(51) Int. Cl.
*H02K 1/24* (2006.01)
*H02K 19/10* (2006.01)
*H02P 25/098* (2016.01)
*H02K 15/02* (2006.01)

(52) U.S. Cl.
CPC ......... *H02K 19/103* (2013.01); *H02P 25/098* (2016.02); *B60Y 2200/91* (2013.01); *B60Y 2200/92* (2013.01); *B60Y 2400/60* (2013.01)

(56) References Cited

U.S. PATENT DOCUMENTS

| | | | | |
|---|---|---|---|---|
| 5,917,263 A * | 6/1999 | Sakuma | ................ | H02K 29/03 310/168 |
| 6,483,212 B1 * | 11/2002 | Mimura | ................ | H02K 1/246 310/168 |
| 9,590,541 B2 * | 3/2017 | Pollock | ................ | H02P 21/04 |
| 2007/0152529 A1 | 7/2007 | Kamiya | | |
| 2011/0169369 A1 | 7/2011 | Liang et al. | | |
| 2012/0274168 A1 | 11/2012 | Holzner et al. | | |
| 2014/0084821 A1 * | 3/2014 | Pollock | ................ | H02P 1/04 318/400.02 |

FOREIGN PATENT DOCUMENTS

| | | |
|---|---|---|
| EP | 2 234 250 A1 | 9/2010 |
| JP | 8-126273 A | 5/1996 |
| JP | 2001-178092 A | 6/2001 |
| JP | 2001-309622 A | 11/2001 |
| JP | 2002-010593 A | 1/2002 |
| JP | 2009-33886 A | 2/2009 |
| JP | 2012-244739 A | 12/2012 |
| WO | WO 2008/111775 A2 | 9/2008 |

OTHER PUBLICATIONS

International Search Report, PCT/EP2015/062684, dated Sep. 23, 2015, 3 pages.
Office Action with English language Summary, JP Application No. 2016-572411, dated Jan. 30, 2018, 8 pp.
Communication pursuant to Article 94(3) EPC, EP Application No. 15726990.3, dated Apr. 25, 2018, 7 pp.
First Office Action with English language translation, CN Application No. 201580030645.2, dated Apr. 28, 2018, 18 pp.
Office Action with English language Summary, JP Application No. 2016-572411, dated Oct. 2, 2018, 7 pp.

\* cited by examiner

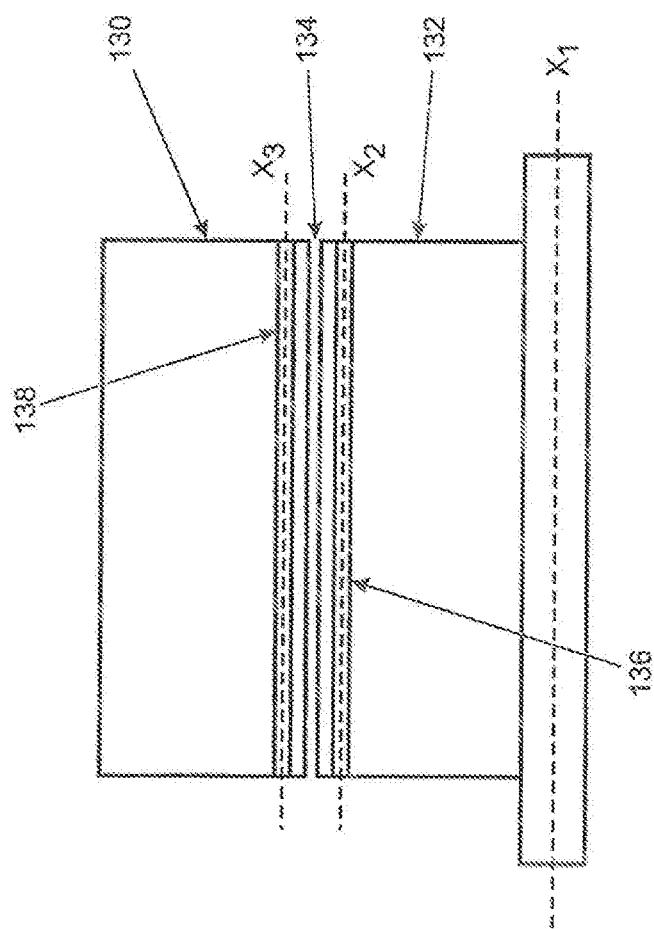

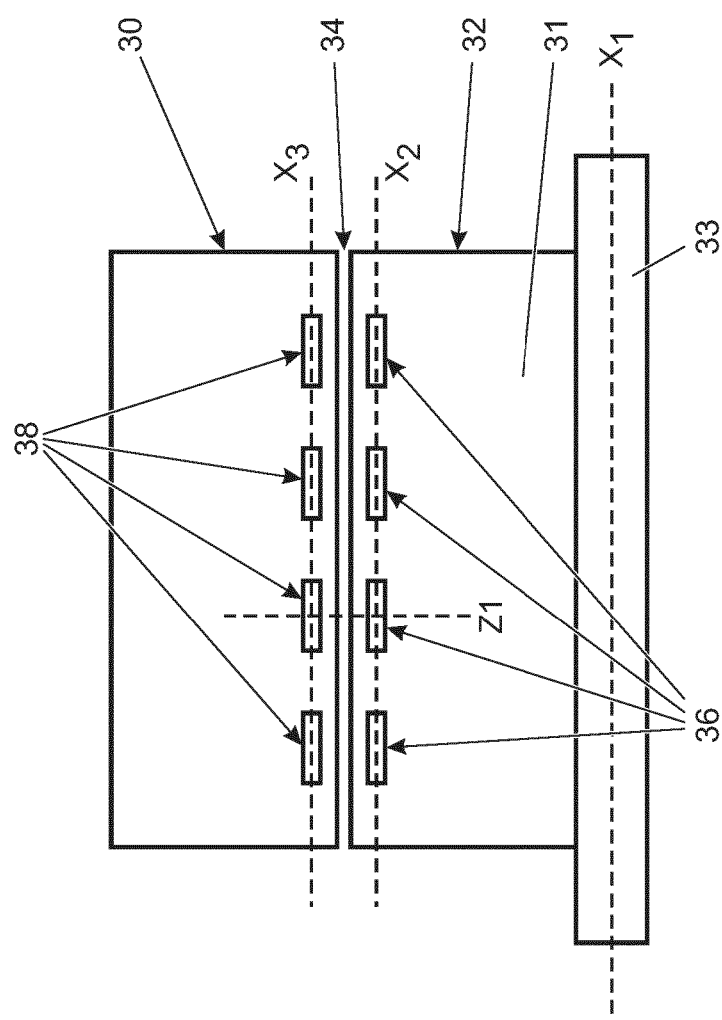

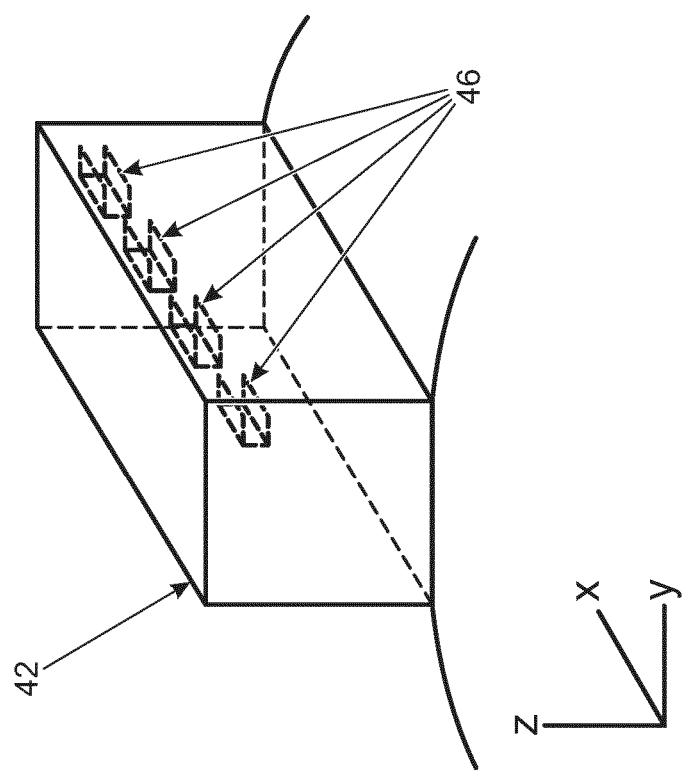

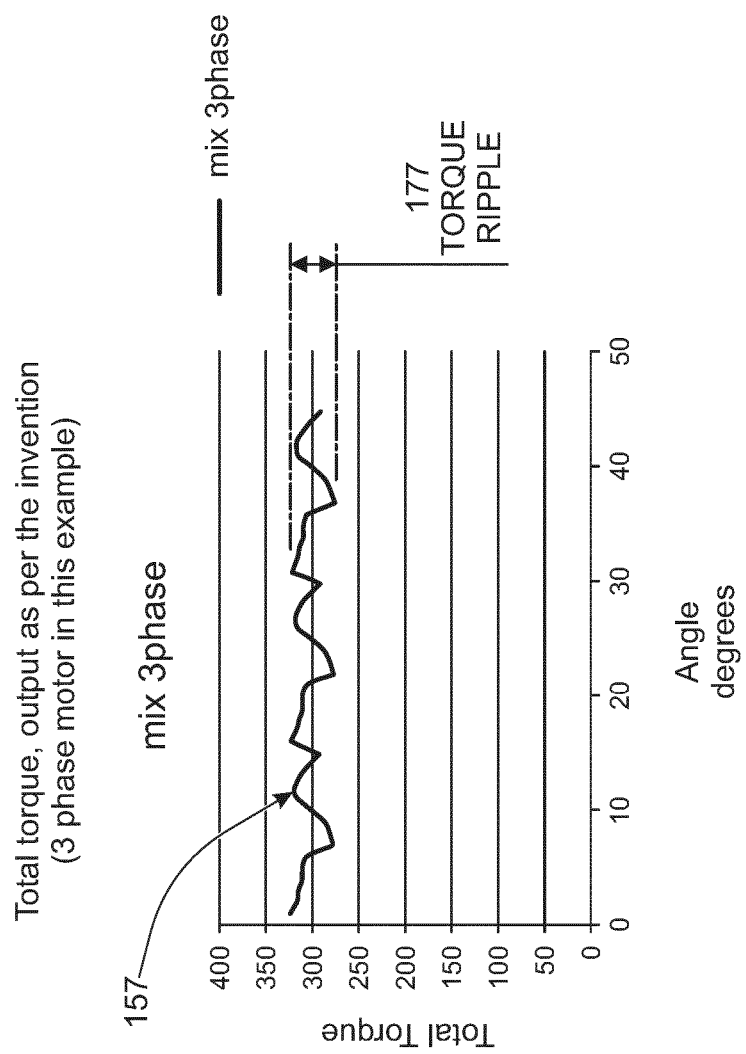

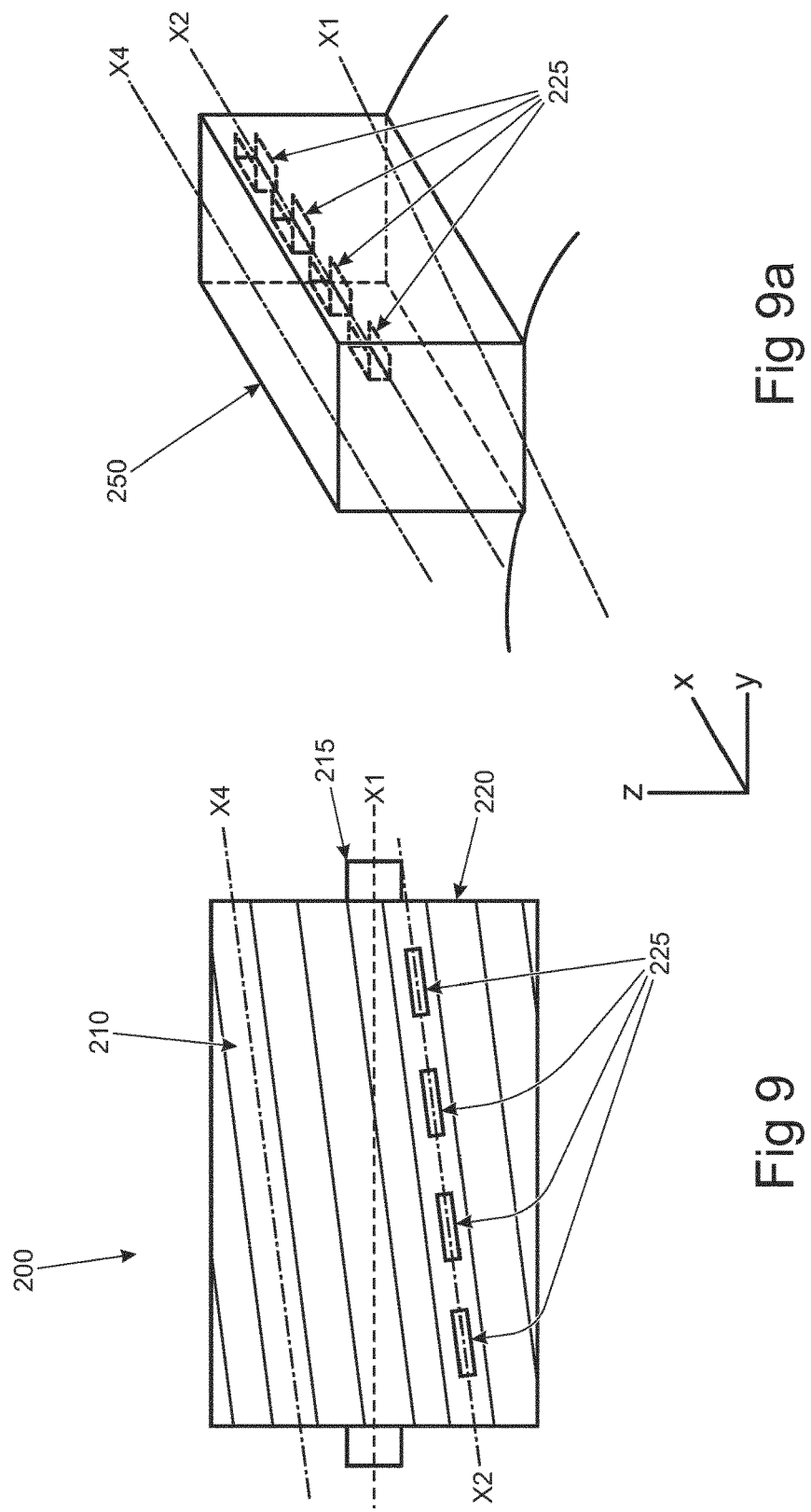

SWITCHED RELUCTANCE MOTOR WITH REDUCED TORQUE RIPPLE

RELATED APPLICATIONS

This application is a 35 U.S.C. § 371 national stage application of PCT Application No. PCT/EP2015/062684, filed on Jun. 8, 2015, which claims priority from Great Britain Patent Application No. 1410450.9 filed on Jun. 12, 2014, the contents of which are incorporated herein by reference in their entireties. The above-referenced PCT International Application was published in the English language as International Publication No. WO 2015/189137 A1 on Dec. 17, 2015.

TECHNICAL FIELD

The present invention relates to switched reluctance motor construction and torque ripple improvements.

Aspects of the invention relate to a switched reluctance motor, improvements to its construction, a controller and a method of control aimed at reducing torque ripple; also a manufacturing method and vehicle.

BACKGROUND OF THE INVENTION

Switched reluctance motors are simple in construction and do not require permanent magnets or rotor coils/slip rings to function. They are therefore cheap and attractive as a potential for hybrid and electric vehicle usage.

Switched reluctance motor function is well understood and typically operates under a 3 phase (A,B,C phase) arrangement where motion is produced as a result of the variable reluctance in the air gap between the rotor and the stator. When a stator winding is energized, producing a single magnetic field, reluctance induced torque is produced by the tendency of the rotor to move to its minimum reluctance position.

Magnetic pole switching is controlled via an inverter to regulate the speed of the rotating magnetic field around the motor and thus the actual speed/torque of the motor output.

Switched reluctance motors have long suffered from NVH (Noise, Vibration and Harshness) problems during use due to high loads between the rotor and stator which in turn cause high mechanical stresses in the casing. This problem can be exacerbated by the high phase switching frequencies and the motor speed itself. Case noise can be generated from radial forces building up between opposing poles—when the inverter switches between one phase and the next, the force is quickly released radially which in turn manifests as a vibration in the stator case. This effect produces direct case generated noise and is the focus of prior art document JP4797227B2.

As well as direct motor casing derived noises there are other possible sources of motor related noise such as vehicle and referred driveline vibrations caused by variation in angular motor torque output. As a motor switches between phases as it rotates there is a fluctuation in motor output torque which is known as torque ripple.

During rotor rotation and when a rotor tooth is approaching the next mating stator tooth/pole the magnetic phase is switched on for that pole pair and the rotor and stator become attracted to each other as the stator is acting like a magnet. The tangential forces exerted across the airgap between the rotor and stator act on the rotor to turn the shaft. The angular torque applied to the rotor shaft varies due to switching current/timing, magnetic field strength and tooth geometry. The variation in torque applied while the motor runs is called torque ripple and this invention seeks to reduce torque ripple and its associated noise problems—for example it may be that the torque ripple of a standard reluctance motor may generate torque output oscillations which are able to excite connected rotating shafts or gears in the driveline, or indeed casings around the rotating parts, which are affected by the referred oscillations. It is also possible that motor torque output oscillations can induce vibrations into the vehicle body shell via driveline mounted components on the body shell. Separately mounted subsystem components on the body shell can be excited also such as pumps or heat shields for example.

It is this problem of motor torque ripple which this invention seeks to address.

Both torsional and radial forces are present between the rotor and stator as the motor rotates. The forces and their direction are determined by the flow direction and density of the flux lines created between the rotor tooth and stator/pole as one sweeps past the other. These lines of flux or force and their magnitude change constantly but can be modelled using available software.

By influencing the direction and density of the flux lines in a timed sense, the torque output characteristics of the motor can be changed significantly so as to reduce torque ripple significantly but without excessive loss of motor torque capability. This invention seeks to outline how these lines of force can be modified in a new way.

Motor stators and rotors are typically manufactured by building up layers of pressed ferrous material forming laminations; these laminations are then bonded or held together using conventional means to form longer stacks. These stacks are typically solid with no voids or air gaps so as to allow the magnetic flux or flux lines to flow unhindered from rotor to stator during motor operation. The laminations are generally made of special electrical steel which may have added silicon and be rolled in such a way as to optimise the flux density in the rolling direction. Using electrical steel can increase flux density by up to 30%. The steel magnetic properties are further influenced by the metallurgical crystal size which is controlled during heat treatment.

Each lamination can also be coated to increase electrical resistance between laminations and thus to reduce eddy currents and losses.

It is known to deliberately include continuous voids or flux barriers in rotor and stator constructions to influence magnetic flux paths during operation of the motor. This is shown in patent JP4797227B2 where the focus is to reduce the deformation of the stator case due to radial forces generated when the rotor is spinning.

A flux barrier may be formed using a void which could be filled with air or another non magnetic material.

It is the aim of the present invention to provide improvements to switched reluctance motor design to reduce the amplitude and duration of torque ripple, resulting in a reduction in motor output torsional oscillations and therefore improvements in referred noise and vibration problems which can be transmitted to other parts of the vehicle.

SUMMARY OF THE INVENTION

Aspects of the invention relate to a switched reluctance motor and the introduction and/or construction of non-continuous, optionally axially distributed, flux barriers within the rotor and/or the stator.

According to an aspect of the present invention there is provided a switched reluctance motor comprising: a rotor part; a plurality of rotor teeth; a stator part; a plurality of stator teeth, wherein one or more of the rotor or stator teeth has one or more non continuous flux barriers sharing a common axis running along a longitudinal axis of said tooth.

There may be provided a switched reluctance motor comprising: a rotor part; a plurality of rotor teeth; a stator part; a plurality of stator teeth, wherein one or more of the rotor or stator teeth has one or more non continuous flux barriers aligned along a longitudinal axis of said tooth.

In an embodiment, the invention may comprise a switched reluctance motor where said longitudinal axis runs substantially parallel to the rotational axis of the rotor shaft.

In an embodiment, the invention may comprise a switched reluctance motor including one or more non continuous flux barriers wherein the longitudinal axis of the rotor teeth run along a skewed axis relative to the rotational axis of the rotor shaft, offering additional Improvements in the smoothing of torque output from the motor.

Alternatively put, it may be that the longitudinal axis of the rotor teeth is skewed relative to the rotational axis of the rotor shaft.

In embodiments, the invention may comprise a switched reluctance motor where the one or more non continuous flux barriers may be present in both the rotor or stator teeth allowing flexibility of manufacture.

In an embodiment, the invention may comprise a switched reluctance motor where the total combined flux barrier length in either the rotor or stator teeth running along a longitudinal axis of said tooth is between 30% and 70% of the total length of the rotor.

In an embodiment, the invention may comprise a switched reluctance motor where the flux barriers are spaced equidistantly along the length of the axis of the flux barrier axis, optionally running substantially parallel to the axis of the rotor shaft or skewed relative to the axis of the motor shaft, which may assist in balancing out the loads along the length of the shaft and/or reducing the bending moment on the rotor axis.

In an embodiment, the invention may comprise a switched reluctance motor where a single continuous flux barrier is placed in an axially central position along a longitudinal axis of any of said teeth, which is advantageous as it could reduce the bending forces along the rotor.

Optionally a switched reluctance motor could be constructed where flux barriers in the rotor and flux barriers in the stator are aligned opposite to each other across the air gap along the x axis, thus avoiding any axial thrust possibility from an offset flux barrier arrangement.

In an embodiment, the invention may comprise a switched reluctance motor where the flux barrier cross section may have a profile which is shaped to form the flux lines in a more acute angle to the tangent of the air gap curvature.

In an embodiment, the invention may comprise a switched reluctance motor where the flux barrier cross section when taken normal to the axis of the motor shaft is either square, elliptical, round, rhomboid, trapezium or a mixture of the aforementioned sections, thus allowing a greater degree of flexibility for controlling the paths the magnetic flux lines can follow.

In embodiments, the invention may comprise a switched reluctance motor where the one or more flux barrier internal volumes may be filled with one or more of air, plastic or non ferrous metal. Having a different material in the flux barrier volume may offer advantages in terms of adding rigidity to rotor or stator parts which may in some cases improve the strength and rigidity of the overall motor parts. This could help with reducing noise and vibration on motors that have large flux barriers which may themselves begin to become emitters of noise—for example merely by virtue of being otherwise hollow spaces.

In an aspect, the invention may comprise a method for control of a switched reluctance motor where a controller is configured to vary the stator winding current in any phase at the time when the non continuous flux barriers are modifying the magnetic flux paths. Controlling the instantaneous motor drive current whilst the non continuous flux barriers are influencing the magnetic forces across the rotor/stator air gap may smooth the torque ripple output of the motor.

In an embodiment, the invention may comprise a controller where the controller is configured to counteract a vehicle driveline resonant frequency or torsional oscillation imbalance. It is common for drivelines to be made up of many interacting components with differing inertias and natural frequencies. Sometimes, unpredicted driveline noise outputs can become a problem when the driveline reaches a specific load and/or speed site during operation. The inclusion of non continuous flux barriers is one way of potentially reducing or tuning torque ripple in a way which could combat driveline noise. Use of the controller in this way offers the potential to vary energising current such that specific resonant frequencies are eliminated. This may be achieved by ensuring that specific magnetic flux alignments or configurations are avoided, perhaps by momentarily ceasing energising of teeth at specific timing points or at specific rotational positions of the rotor during a rotation of the rotor.

In an embodiment, the invention may comprise a method of control of a switched reluctance motor as claimed in any one of claims so as to be able to control motor current in a way which could be beneficial to the reduction of noise and/or torque ripple.

In an embodiment, the invention may comprise a method of manufacture of a switched reluctance motor where the motor or stator laminations are punched in such a way as to create the flux barrier voids when the rotor or stator is assembled into a stack. This offers a cheap and quick method of manufacture.

Within the scope of this application it is expressly envisaged that the various aspects, embodiments, examples and alternatives set out in the preceding paragraphs, in the claims and/or in the following description and drawings, and in particular the individual features thereof, may be taken independently or in any combination. Features described in connection with one embodiment are applicable to all embodiments, unless such features are incompatible.

BRIEF DESCRIPTION OF THE DRAWINGS

One or more embodiments of the invention will now be described, by way of example only, with reference to the accompanying drawings, in which;

FIGS. 2 and 2a are diagrams showing the flux paths between a rotor and a stator for a switched reluctance motor which has added continuous flux barriers as per prior art JP4797227B2.

FIG. 3 is a cross section through a rotor and stator showing an example distribution of a multiple non-continuous flux barrier as per an embodiment of the invention.

FIG. 4 is a 3D sketch of an example embodiment of the distribution of flux barriers along a rotor tooth as per the embodiment of FIG. 3.

FIG. 7b is a graph of averaged torque output from a 3-phase switched reluctance motor as per the invention.

FIG. 9 shows a side view of an alternate embodiment of the invention where the non continuous flux barriers could be applied to skewed tooth motor design.

FIG. 9a shows a 3d sketch of a single rotor tooth in taken from the embodiment shown in FIG. 9a.

DETAILED DESCRIPTION

A switched reluctance motor in accordance with embodiments of the present invention is described herein with reference to the accompanying Figures.

The terminology referring to teeth and poles are very closely related throughout this description although a pole can be distinguished as being a tooth which has been energised with an electrical coil such that it is magnetic and thus called a magnetic pole or pole.

General motor construction for a switched reluctance motor would consist of a shaft rotatable around its longitudinal axis, the shaft being coupled to a rotor core, the rotor core extending radially outwards and supporting multiple rotor teeth equally spaced around the rotor.

Many combinations of stator and rotor teeth numbers are possible such as 6/4, 8/6 or 12/8 etc but this is not an exhaustive list. In the examples given the stator and rotor teeth numbers are 12/8.

Figure 1:
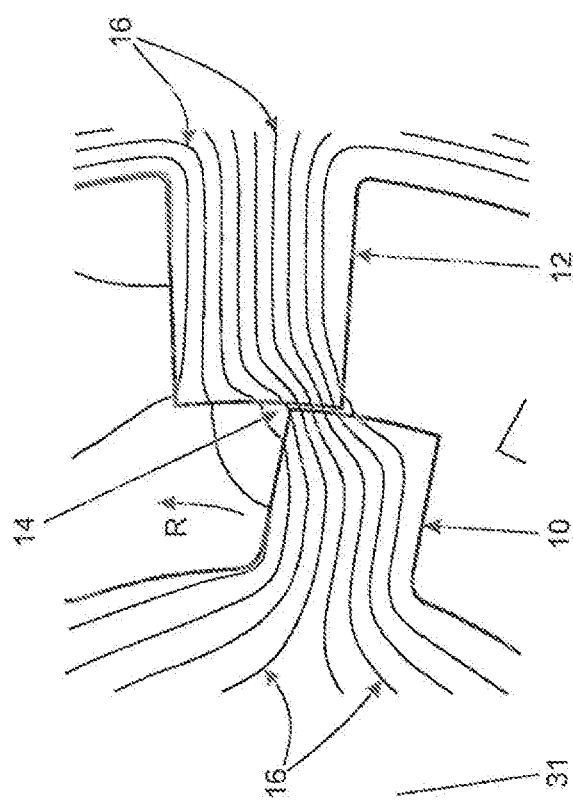
FIG. 1 is a diagram showing the flux paths between a rotor and a stator for a standard switched reluctance motor.

FIG. 1 shows a cross section of a pair of interacting rotor and stator teeth in a standard switched reluctance motor, the rotor teeth being supported on a rotor core (31).

An example single rotor tooth (10) is shown in close proximity to a stator tooth (12) with an air gap (14). The multiple flux lines (16) show how the magnetic fields flow and interact between the rotor tooth and stator pole. The magnetic flux lines will change dynamically as the rotor tooth moves past the stator pole and the torque generated in the rotor due to the forces acting across the air gap will vary greatly as the rotor pole rotates past the stator pole in the direction of the arrow (R).

The air gap (14) is usually minimised to maximise efficiency and the torque output of the motor. It can be seen that the flux lines across the air gap (14) flow in an undisturbed pattern and angle which in turn generates specific torque.

The switched reluctance motor produces torque on the basis of varying reluctance along the magnetic circuit. When a stator tooth is energized the tooth becomes a magnetic stator pole and attracts the closest rotor tooth toward alignment of the rotor and stator teeth. The magnetic flux between a rotor tooth and stator pole always seeks to travel the path of least magnetic resistance or minimum reluctance. Torque is produced by this tendency of the magnetic circuit to adopt a configuration of minimum reluctance and is dependent on the direction of current flow. With appropriate rotor and stator geometry and consecutive energisation of successive phases, continuous motor rotation in either direction is possible. Average torque output can be calculated generally as a function of current and phase angle of the rotor relative to the stator. Instantaneous torque and thus torque ripple can be influenced more locally by the relative angle of rotor and stator pole pairs and the switching characteristics of the inverter. For example, as a stator tooth becomes energised thus attracting a rotor tooth, the magnetic field attraction will be weak initially. As the rotor tooth and stator pole become more overlapped the magnetic field strength will build as more flux lines will be active, increasing the force between the teeth. As the teeth approach alignment the tangential component of the force (which produces the torque) will diminish as the majority of the force acts radially. When the teeth reach the aligned position, there will be no tangential force being produced, which is when the inverter will switch off the coil magnetising the stator pole. Torque ripple can be influenced by the inclusion of flux barriers in the rotor and stator teeth as they displace the flux lines and change the angle of the flux lines as they approach the air gap. This in turn changes the force in both the radial and tangential directions.

The inclusion of flux barriers has the effect of displacing the flux lines during rotor and stator teeth overlap and can be used in conjunction with the control of the pole energisation current to control and vary the angular torque characteristics of the motor.

FIG. 1 shows partial rotor and stator tooth overlap so in this condition the radial and tangential forces between these teeth would continue to change as the rotor and stator teeth became more aligned. The forces causing the rotor to rotate with the stator are controlled using a 3-phase inverter switching device and techniques for such control are known.

Figure 2:
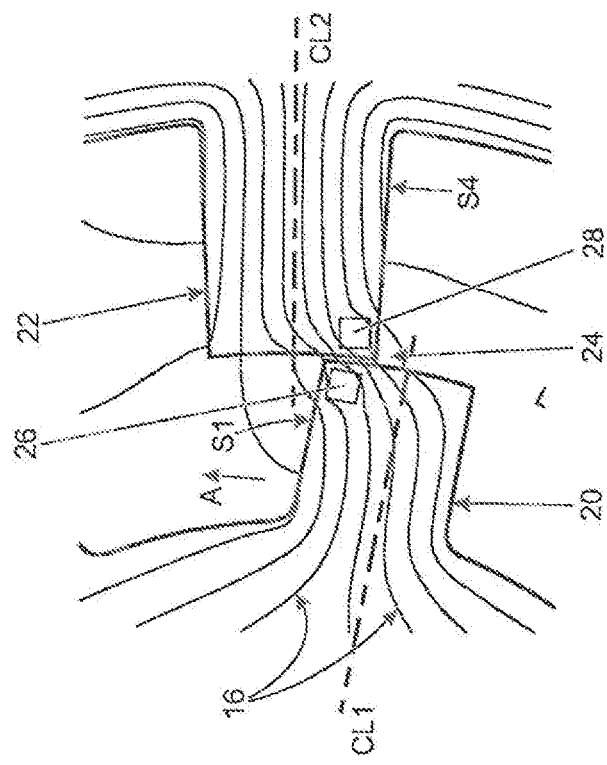

FIG. 2 is a cross section axial view of a switched reluctance motor which has flux barriers (26,28) included in both the rotor and stator teeth as per prior art JP4797227B2. The rotor and stator teeth orientations are drawn at the same relative angle in both FIG. 1 and FIG. 2 and it can be seen that the flux density is reduced in FIG. 2 when compared to FIG. 1 due to the inclusion of flux barriers.

FIG. 2a is diagram showing a cross section through the rotor and stator showing a continuous flux barrier as per the prior art JP4797227B2. In this example the flux barriers (136,138) run continuously through the rotor and stator teeth being (132,130) respectively. The rotor flux barrier (136) is aligned with the axis (X2) and the stator flux barrier (138) is aligned with the axis (X3). The rotor flux barrier (136) with central axis (X2) rotates around and parallel to axis (X1) which runs through the core of the rotor.

The flux barrier can be formed during the pressing process of the laminations by having an extra hole pressed out in each lamination in the tooth regions during stamping. This would involve small modifications to both sides of the pressing die. When rotor and stator laminations are assembled together in a common axis with the stamped flux barriers rotationally aligned, the built up laminations will create what is known as a stack and form a flux void or barrier in the tooth regions within the stack, running parallel to the axis (X1) of the rotor shaft, through the laminations. The flux barrier can be continuous as shown in FIG. 2a as per the prior art JP4797227B2. In accordance with aspects and embodiments of the invention the non-continuous flux barrier may be multiply non continuous as per FIG. 3 or FIG. 4 or non-continuous as per FIG. 3a depending on the combinations of punched and non punched pressed laminations used during stack assembly.

In FIG. 2 the rotor flux barrier (26) is shown as being offset from the centre line (CL1) of the rotor tooth towards surface (S1) and the stator flux barrier (28) is offset the other way from stator tooth centre line (CL2), towards surface (S4). These offsets are deliberate so that when the rotor tooth moves in the direction of arrow (A) and as the flux barriers pass each other, the forces acting across the air gap may be influenced in an advantageous way, for example by improving the smoothness of torque delivery or reducing torque ripple from the motor output shaft.

The offset of the rotor flux barrier (26) from the centre line (CL1) of the rotor tooth can be more or less than the offset of the stator flux barrier (28) from stator tooth centre line (CL2) and advantageously this can help with smoothing torque output from the motor as the rotor tooth passes the stator pole by changing the flux path through low reluctance regions.

When comparing FIG. 1 with FIG. 2, which are shown with teeth in the same relative position, it can be seen that the number of flux lines (16) acting across the air gap (14) is 6 in FIG. 1 and only 4 in FIG. 2. This illustrates that at this point of rotation the magnetic field will be acting more strongly in the rotor without flux barriers as it has more active flux lines and the forces will be higher across the air gap. The presence of the flux barriers excludes the possibility of flux lines flowing across the overlapped rotor teeth and stator pole at this angular rotation, thus weakening the torque effect on the rotor at this time. Essentially this delays the application of maximum torque on the rotor as will be shown later. The continuous flux barrier shown in FIG. 2 runs axially all the way through the rotor and stator stack lengths without a break, hence being continuous as described in relation to prior art document JP4797227B2.

In the embodiment as shown in FIG. 2, if the motor rotor is run in the opposite direction to arrow (A) the torque output characteristics will be different, It may be that the torque output has more ripple but that the average torque output is higher. This can be advantageous in a vehicle as it is common to design reverse gear to have more torque capability in the reverse direction than forward such that the driver can always reverse out of a gradient they drive into. So it may be preferable to design the rotor to rotate in the direction of arrow (A) as a predominantly forward direction thus giving more smooth torque delivery in the majority of driving conditions, but having a higher torque capability in the reverse direction where the increased noise potential is traditionally less important.

The timing of the inverter control for the 3 phases may be changed to better tune the torque output to fit in with the modified motor flux lines caused by the flux barriers. With continuous flux barriers, positive torque will be available over a longer period, so a lower current over a longer conduction period could help to smooth torque ripple.

The flux barrier in this case maybe simply be an air void or it could comprise any non ferrous material such as plastic, ceramic material or another metal. The flux barrier could be in only one of either the rotor tooth or stator tooth. The flux barrier as per the invention may be a non-continuous flux barrier with spaces along the flux barrier axis that are not flux barriers filled with normal electrical steel. The flux barriers in the case of the proposed invention are non continuous so may be multiple and separated by electrical steel as an example.

The prior art JP4797227B2 identifies continuous flux barriers with the aim of reducing radial force generated motor casing noise, whereas the proposed invention using non continuous flux barriers seeks to reduce the motor output torque ripple (shaft angular torque variation and torsional shaft vibrations) which may cause different noise problems, particularly around a vehicle if fitted to one.

FIG. 3 in accordance with the invention shows an example cross section taken through the axis (X1) of the motor shaft (33) and shows multiple non continuous flux barriers which share common axes (X2,X3) parallel to the shaft axis (X1). In this example the rotor tooth (32) has 4 non continuous flux barriers (36) sharing a common axis (X2) and the stator (30) has 4 non continuous flux barriers (38) sharing a common axis (X3). In this example the flux barriers are axially aligned with each other across the airgap (34) and pass each other as the motor rotates. The non continuous flux barriers (36,38) are aligned in this example along, for example, the radial line (Z1) shown in FIG. 3.

In this example the flux barriers run along the (X2) and (X3) axes and they comprise 50% of the axial length of the rotor/stator in alternate segments. The spacing between the non continuous (segmented) flux barriers in this example is filled with electrical steel. The respective percentages of flux barrier segments and electrical steel between them can vary along the (X2,X3) axes.

It can be seen from FIG. 2 that the flux lines (16) are not able to run through the flux barriers (26,28) as there is no magnetic medium present to transmit the flux lines. The flux lines follow the path of lowest reluctance, which in the case of an axially continuous void will mean being diverted around it as shown in FIG. 2. This effective exclusion of flux lines because of the presence of the flux barrier weakens the magnetic field across the air gap (24) and reduces the instantaneous torque capability.

FIG. 4 is a 3D sketch of an embodiment of an example distribution of flux barriers along a rotor tooth as per the invention. The rotor tooth (42) shown shows embedded flux barriers (46) along the length of the tooth, which would not be visible to the eye when viewed externally.

The number of flux barriers which can be embedded inside the rotor and or stator can be determined by the aspect ratio of the flux barrier. It is important that the aspect ratio of the flux barrier (46) gives a flux barrier which is longer in the (X) axis than the width in the (Y) axes, as shown with the flux barriers (46) in FIG. 4. It must be ensured that the direction of the flux lines takes a path which must run parallel to the (Y) and (Z) axes (ie: in the YZ plane) and follow the layers of the laminations. This ensures that the lines of force act in the same plane as the direction of rotation of the motor and deliver maximum effect for reduction of torque ripple.

Note, if the length of the non continuous flux barriers in the X (ie; X2,X3) axes were too short because not enough laminations had been layered together to form the flux barrier within the stack, then it would be possible for the magnetic flux lines to leak around the flux barriers in the X axis direction, which would work against the principle of reducing the torque ripple. Additionally at each intersection point between laminations with and without flux barriers, it will be possible for the magnetic flux lines to leak around the flux barriers in the alternate X axis, which works against the principle of reducing torque ripple. For this reason, the number of intersection points (and hence the number of alternating lamination segments) should be kept low.

FIG. 9 shows an alternate embodiment of the invention where the non continuous flux barriers (225) could be applied to a skewed tooth motor design. FIG. 9 shows a side view of a switched reluctance rotor assembly (200) having skewed rotor teeth (210). A mating stator part (not shown) could have a conventional 'straight' stator teeth arrangement or could be partially skewed as would be understood by a person skilled in the art of skewed rotor and stator construction. Additionally the Stator could be the skewed part and the rotor could be of conventional straight construction. In the embodiment of FIG. 9 the skewed rotor construction consists of a central shaft (215) supporting the rotor (220) and skewed teeth (210). The skewed teeth (210) are aligned along axis (X4) and the example non continuous flux barriers (225) have an axis (X2) which runs parallel to the axis of the skewed teeth (210) along the axis (X4).

FIG. 9a shows a single tooth (250) of the skewed rotor assembly (200) shown in FIG. 9. As in FIG. 9 the example four non continuous flux barriers (225) are shown to be embedded within the material of the tooth (250) and run along the axis (X2). In this example the manufacturing method would still require the use of built up laminations as per the non skewed method, however when assembling a skewed rotor each adjacent lamination would need to be rotationally misaligned about axis (X1) by a small consistent amount as would be understood by a person skilled in the art. By skewing the laminations during manufacture the non continuous flux barriers would naturally align to an axis parallel to the skew such that the non continuous flux barrier axis (X2) in FIG. 9a would be parallel to the axis (X4) of the skewed tooth.

The rotor assembly (200) rotates around the axis (X1) as usual and the skewed nature of the motor has advantages of delivering smoother running of the motor.

From the Figures it can be seen that the flux barrier cross sections are substantially square in these examples, but they could be round, elliptical or any other shape and still act as a flux barrier. To be clear, the sectional shape of the flux barriers as seen in FIG. 2 can be shaped in a way that will force the magnetic flux lines into a certain path from the rotor tooth to the stator pole and this may influence the density and direction of the flux lines around the flux barriers to be able to modify the motor torque profile as the rotor tooth passes the stator pole. Advantageously this will allow the profile of the individual torque curves per phase to be defined in some way by the cross section of the flux barrier and the relationship between the rotor and stator flux barriers. Further, this flux barrier sectional shape can be shaped in such a way that it can determine the smoothness of the combined three-phase torque output.

The flux barriers in the example shown in FIG. 3 and FIG. 4, show evenly spaced, multiple non continuous flux barriers (36,38,46) surrounded by electrical steel. The spacing in this example is shown to be even along the (X) axis but it may be uneven. Additionally the rotor and stator flux barriers in this example are aligned and parallel with each other along the (X2,X3) axes as the rotor rotates, it could be that in another embodiment the flux barriers could be offset along the (X2,X3) axes so that the flux barriers in the rotor and stator were still parallel to each other but were no longer aligned. The even spacing shown in FIG. 3 and FIG. 4 advantageously serves to help with force loading along the length of the rotor shaft to balance out any beaming or uneven distribution of forces along the shaft.

Figure 3A:
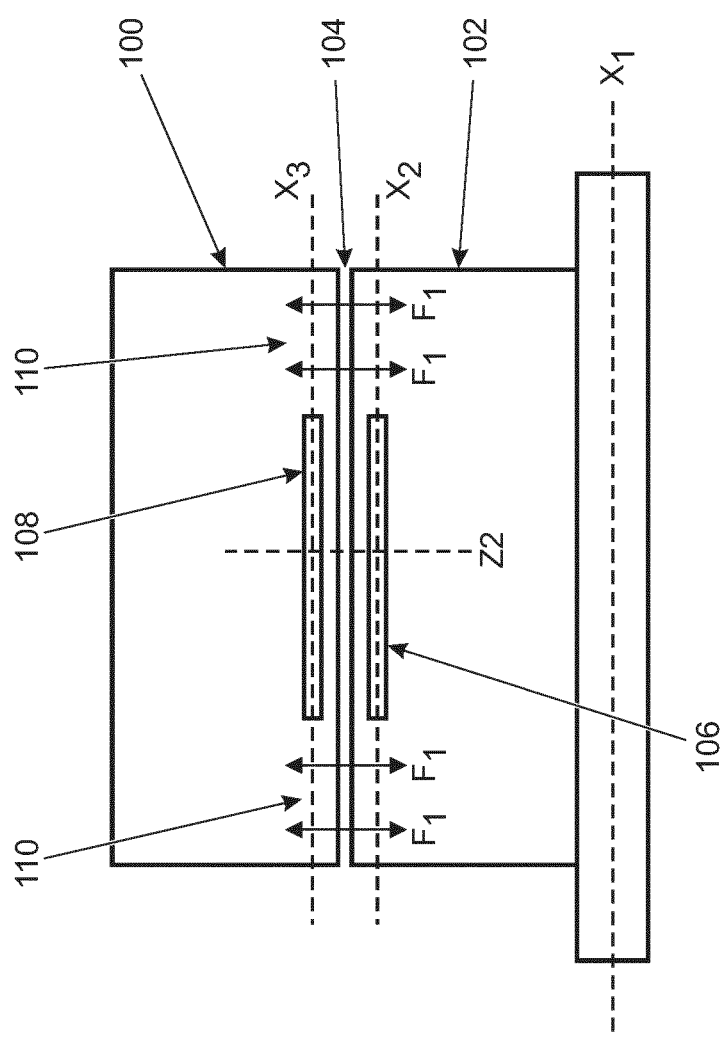
FIG. 3a shows an alternate embodiment of flux barrier design where there is a long single non continuous flux barrier in each of a rotor and stator.

FIG. 3a shows an alternate flux barrier design where there are long single non continuous flux barriers (106,108) included in the rotor (102) and stator (100) in an axially central position. Again the flux barriers are aligned to each other in the (Z2) axis so that they pass each other as the rotor rotates.

As before the magnetic flux lines have to cross the air gap (104) and in the regions indicated by the flux arrows (F1) in the locations (110) the flux lines are not impeded by the flux barriers, which in turn yields a higher radial force in this region. It has already been shown that where flux barriers are present and they are passing each other in an aligned condition as shown in FIG. 2 the flux density is reduced across the air gap when compared to FIG. 1 which has no flux barrier. This is demonstrated by there being less lines of flux present across the airgap in FIG. 2 versus FIG. 1.

So the flux patterns which will be acting around the flux barriers (106,108) about the axis (Z2) in FIG. 3a will be reduced in strength in the radial direction because of the reduced flux density. One advantage of this particular construction is that the higher radial forces are acting at the ends of the rotor which is closer to the bearing support, conversely the reduced radial forces are concentrated towards the centre of the rotor where radial bearing support is reduced. This design approach may well be used to optimise shaft strength and/or to minimise beaming/bending along the length of the shaft.

Figure 5:
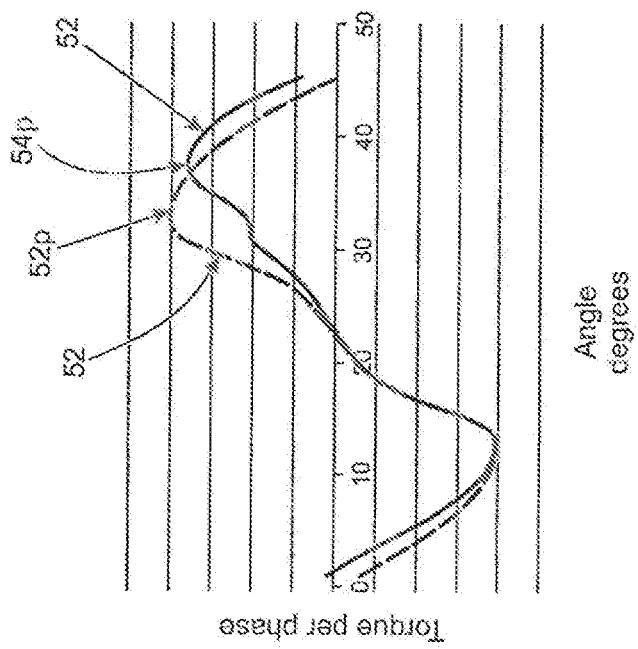
FIG. 5 is a graph showing the comparison of torque per phase characteristics between a standard switched reluctance motor and one which has added continuous flux barriers as per prior art JP4797227B2.

FIG. 5 is a graph showing the comparison of torque per phase characteristics between a standard 12/8 switched reluctance motor (52) and one which has an added continuous flux barrier (54) as per prior art JP4797227B2. Over a 45 degree rotation the comparison shows the motor without the continuous flux barrier does have an earlier and higher peak torque output (52P). However the motor with the continuous flux barrier develops torque (54) at a slower rate and peaks at a lower maximum torque (54P), but the torque decay rate is also reduced delivering an overall smoother torque output.

Figure 6:
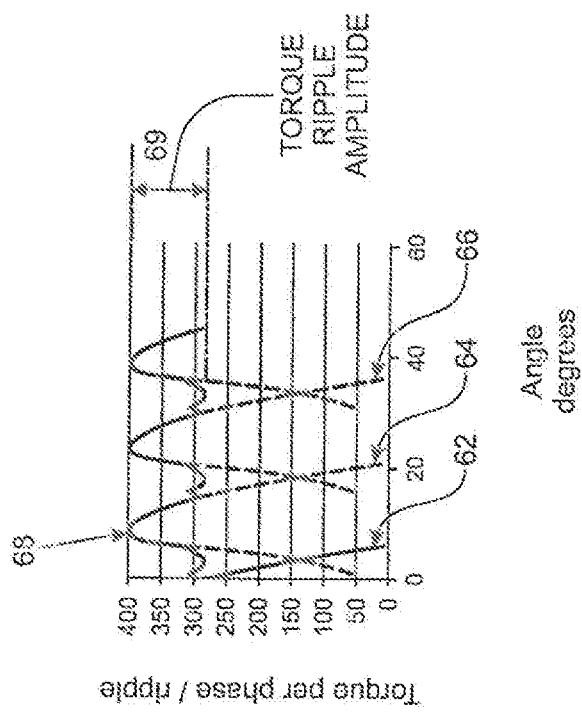
FIG. 6 is a graph showing an example of torque ripple experienced from a standard 3-phase switched reluctance motor with no flux barrier.

FIG. 6 is a graph showing an example of torque ripple experienced from a standard 3-phase switched reluctance motor with no flux barrier in either rotor or stator. Essentially it represents 3 separate phases each being the single phase (52) shown in FIG. 5, but overlaid at regular intervals to give the resultant torque line 68 showing 3 phase average torque output. In this example phase 'a' (62), phase 'b' (64) and phase 'c'(66) are overlaid at 120 degree phase angles and the resultant averaged torque output (68) is shown as a solid line. FIG. 6 shows that torque ripple amplitude (69) is circa 110 Nm which is measured from the peak and trough of the average torque output (68) and would be regarded as normal for a motor of this kind.

Figure 7:
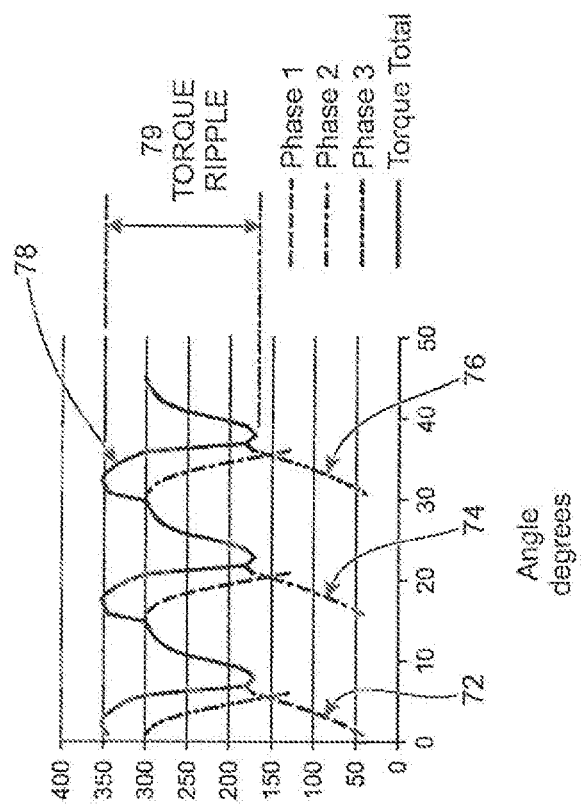
FIG. 7 is a graph showing an example of torque ripple experienced from a switched reluctance motor including a continuous flux barrier as per prior art JP4797227B2.

FIG. 7 is a graph showing an example of torque ripple experienced from a 3-phase switched reluctance motor characterised by including a continuous flux barrier as per the prior art JP4797227B2. Again as per FIG. 6 this is assuming 3 individual phases (72, 74, and 76) are overlaid at a phase angle spacing of 120 degrees. The resultant total averaged torque (78) is shown to have distinctively different characteristics when compared to FIG. 6. The switched reluctance motor with continuous flux barrier shows a higher torque ripple amplitude (79) of circa 180 Nm from peak to trough of total averaged torque output, taken from the total torque line (78).

This is explained as the individual phase shapes are now shaped and spaced in such a way that this effect occurs when they are overlaid at 120 degrees phase angle, even though the individual peak torque of the individual phases (54) is lower as shown in FIG. 5 as an example. As a result, prior art JP4797227B2 can be seen to have lessened the problem of radial stress, which it was intended to address, but has now exacerbated the problem of torque ripple as a consequence.

This is a useful observation when comparing two clear design options (with and without flux barriers) but the new and inventive concept being proposed in this disclosure goes beyond what can be determined from these graphs and the prior art noted earlier. The inventive concept now assumes a non continuous flux barrier design, the flux barriers being spaced along an axis substantially parallel to the shaft axis, the flux barriers being spaced evenly in the given examples with a 50/50% spacing distribution along a stack as described earlier.

According to aspects and embodiments of the invention, by producing a rotor and stator combination, each having a multiple non continuous flux barrier with an even distribution (i.e. having a 50/50% distribution) as illustrated in FIGS. 3 and 4, generates a much reduced torque ripple effect without a large torque output reduction.

FIG. 7b is a graph of averaged torque output from a 3 phase switched reluctance motor (157) as per the invention. The torque ripple (177) is seen to be greatly reduced over both prior art examples, at just 45 Nm peak to trough.

Figure 8:
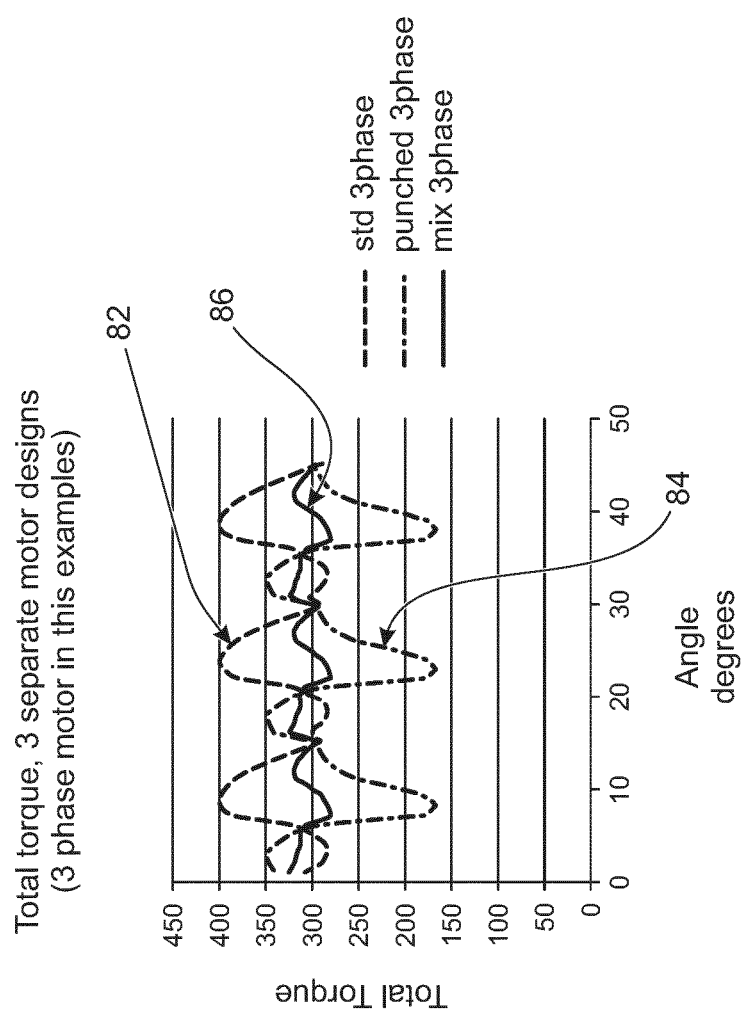
FIG. 8 is a graph showing an example of averaged torque ripple experienced from 3 separate designs of 3-phase switched reluctance motors.

FIG. 8 is a graph showing an example of averaged torque ripple experienced from 3 different 3-phase switched reluctance motors, all on the same axes for comparison. The total average torque output for the standard switched reluctance motor design with no flux barriers (82) showing a circa 110 Nm torque ripple ((69) taken from FIG. 6), versus switched reluctance motor with a continuous flux barrier through both the rotor and stator (84) having a circa 180 Nm torque ripple ((79) as per FIG. 7), versus the switched reluctance motor having non continuous 50/50 flux barriers as per the example invention (86) showing a max torque ripple of circa 45 Nm ((177) as per FIG. 7b).

The torque ripple of an embodiment of the invention as shown in FIG. 7b compared to FIG. 6 which is a standard switched reluctance motor with no flux barrier is shown to be 59% lower, which is a large improvement in the smoothness of the torque output for the motor and is regarded as a large advantage when reducing torque ripple and associated vibration problems. Further, the radial forces acting on the stator can be shown to be reduced by circa 12% in the same example, which is a substantial reduction in potential case noise generation. These improvements are shown to occur with only a small resultant reduction in the average torque output.

The skilled person will understand that a flux barrier in a rotor or stator tooth may be considered to be "non-continuous" within the meaning of the present invention if it does not extend along the entire length of the tooth. Accordingly, a non-continuous flux barrier does not provide a through hole in the tooth it is located in, whereas a continuous flux barrier would provide a through hole in the tooth. In some embodiments the non-continuous flux barrier may be fully embedded within a rotor or stator tooth, so that the flux barrier is not visible in the assembled rotor or stator.

It will be appreciated that various changes and modifications can be made to the present invention without departing from the scope of the present application.

The invention claimed is:

1. A switched reluctance motor, comprising:
a rotor comprising a plurality of rotor teeth; and
a stator comprising a plurality of stator teeth;
wherein at least one of the rotor teeth has one or more non-continuous flux barriers separated along an axis parallel to a longitudinal axis of the at least one of the rotor teeth, wherein all of the one or more non-continuous flux barriers of the at least one of the rotor teeth are enclosed within the at least one of the rotor teeth and do not extend through to an outer surface of the at least one of the rotor teeth.

2. The switched reluctance motor of claim 1, wherein the longitudinal axis is skewed relative to a rotational axis of a shaft of the rotor.

3. The switched reluctance motor of claim 1, wherein at least one of the stator teeth has one or more non-continuous flux barriers.

4. The switched reluctance motor of claim 1, wherein the one or more non-continuous flux barriers comprises a plurality of flux barriers that are spaced equidistantly along a length of a flux barrier axis.

5. The switch reluctance motor of claim 1, wherein the one or more non-continuous flux barriers is a single non continuous flux barrier that is placed in an axially central position along a longitudinal axis of any of the rotor teeth.

6. The switched reluctance motor of claim 1, wherein the one or more non-continuous flux barriers comprises at least one flux barrier in a rotor tooth and a stator tooth has at least one non-continuous flux barrier, the at least one flux barrier in the rotor tooth and the at least one flux barrier in the stator tooth being aligned opposite to each other across an air gap between the rotor and stator.

7. The switched reluctance motor of claim 6, wherein a flux barrier cross-section of the one or more non-continuous flux barriers has a profile which is shaped to form flux lines in an acute angle to a tangent of a curvature of the air gap.

8. The switched reluctance motor of claim 1, wherein a flux barrier cross-section of the one or more non-continuous flux barriers when taken normal to an axis of a shaft of the motor is either square, elliptical, round, rhomboid, trapezium or a composite of the aforementioned shapes.

9. The switched reluctance motor of claim 1, wherein an internal volume of the one or more flux barriers comprises one or more of air, plastic or non ferrous metal.

10. The switched reluctance motor of claim 1, wherein the one or more non-continuous flux barriers runs along the longitudinal axis that is offset from a radial centerline of the at least one of the rotor teeth.

11. The switched reluctance motor of claim 1, where the one or more non continuous flux barriers are present in both the rotor teeth and the stator teeth, wherein the flux barriers in the stator teeth are offset from a radial centerline of the stator teeth in a first direction and the flux barriers in the rotor teeth are offset from a radial centerline of the rotor teeth in a second direction, wherein the second direction is opposite to the first direction.

12. The switched reluctance motor of claim 1, wherein the one or more of the rotor teeth comprises a plurality of laminations and at least one of the plurality of laminations comprises a flux barrier as the one or more non-continuous flux barriers and at least one other lamination of the plurality of laminations comprises no flux barriers.

13. A method of controlling a switched reluctance motor, the switched reluctance motor having a rotor comprising a plurality of rotor teeth, a stator comprising a plurality of stator teeth, and wherein at least one of the rotor teeth has one or more non-continuous flux barriers separated along an axis parallel to a longitudinal axis of the at least one of the rotor teeth, wherein all of the one or more non-continuous flux barriers of the rotor teeth are enclosed within the at least one of the rotor teeth and do not extend through to an outer surface of the at least one of the rotor teeth, the method comprising:
varying a stator winding current in any phase at a time when the one or more non-continuous flux barriers are modifying magnetic flux paths.

14. A method of manufacturing a switched reluctance motor, the switched reluctance motor having a rotor comprising a plurality of rotor teeth, a stator comprising a plurality of stator teeth, wherein at least one of the rotor teeth has one or more non-continuous flux barriers separated along an axis parallel to a longitudinal axis of the at least one of the rotor teeth, the method comprising:

punching rotor laminations to create non-continuous flux barrier voids; and assembling the rotor laminations into a stack to form the rotor of the switched reluctance motor, wherein the assembling of the rotor laminations into a stack forms rotor non-continuous flux barriers, wherein the rotor non-continuous flux barriers are all enclosed within the at least one of the rotor teeth and do not extend through to an outer surface of the at least one of the rotor teeth.

15. The method of claim 14, further comprising:

punching stator laminations to create non-continuous flux barrier voids; and assembling the stator laminations into a stack to form the stator of the switched reluctance motor, wherein the assembling of the stator laminations into a stack forms stator non-continuous flux barriers.

* * * * *